United States Patent

Kappel et al.

[11] Patent Number: 6,144,418
[45] Date of Patent: Nov. 7, 2000

[54] COMPUTER MONITOR SCREEN SHADE AND DYNAMICALLY ADJUSTABLE MAGNIFIER

[75] Inventors: Herman Kappel, Lawrence; Gregory Carbonaro, East Islip, both of N.Y.

[73] Assignee: Kantek, Inc., East Rockaway, N.Y.

[21] Appl. No.: 08/869,599

[22] Filed: Jun. 5, 1997

[51] Int. Cl.[7] .............................. H04N 5/72; G02B 27/00
[52] U.S. Cl. ........................ 348/834; 348/842; 359/601
[58] Field of Search .................................. 359/601, 609, 359/613, 802, 808, 809; 348/373, 834, 825, 826, 836, 842

[56] References Cited

U.S. PATENT DOCUMENTS

| | | | |
|---|---|---|---|
| 4,444,465 | 4/1984 | Giulie et al. | 350/276 R |
| 4,529,268 | 7/1985 | Brown | 350/276 R |
| 4,577,928 | 3/1986 | Brown | 350/276 |
| 5,121,253 | 6/1992 | Waintroob | 359/601 |
| 5,155,627 | 10/1992 | Keehn et al. | 359/609 |
| 5,200,859 | 4/1993 | Payner et al. | 359/857 |
| 5,233,468 | 8/1993 | McNulty | 359/601 |
| 5,243,463 | 9/1993 | Waintroob | 359/601 |
| 5,519,458 | 5/1996 | King | 348/834 |
| 5,900,979 | 5/1999 | Heller et al. | 359/609 |

*Primary Examiner*—Vu Le
*Attorney, Agent, or Firm*—Schweitzer Cornman Gross & Bondell LLP

[57] ABSTRACT

A computer monitor screen glare shade has a top and sides which are rigidly mounted to a monitor housing and project forwardly thereof. Stop strips are provided to properly position the shade with respect to the monitor. The stops may also function as barriers to the passage of ambient light between the shade sides and the sides of the monitor. A magnifier may be adjustably mounted to the shade for dynamic magnification adjustment. The magnifier can be locked in place at a chosen magnification location. The stop strips allow the glare shade to accommodate monitors of differing width. Further size accommodation may be accomplished by the adjustable interfitting of shade side members into a sleeve-like top member.

7 Claims, 3 Drawing Sheets

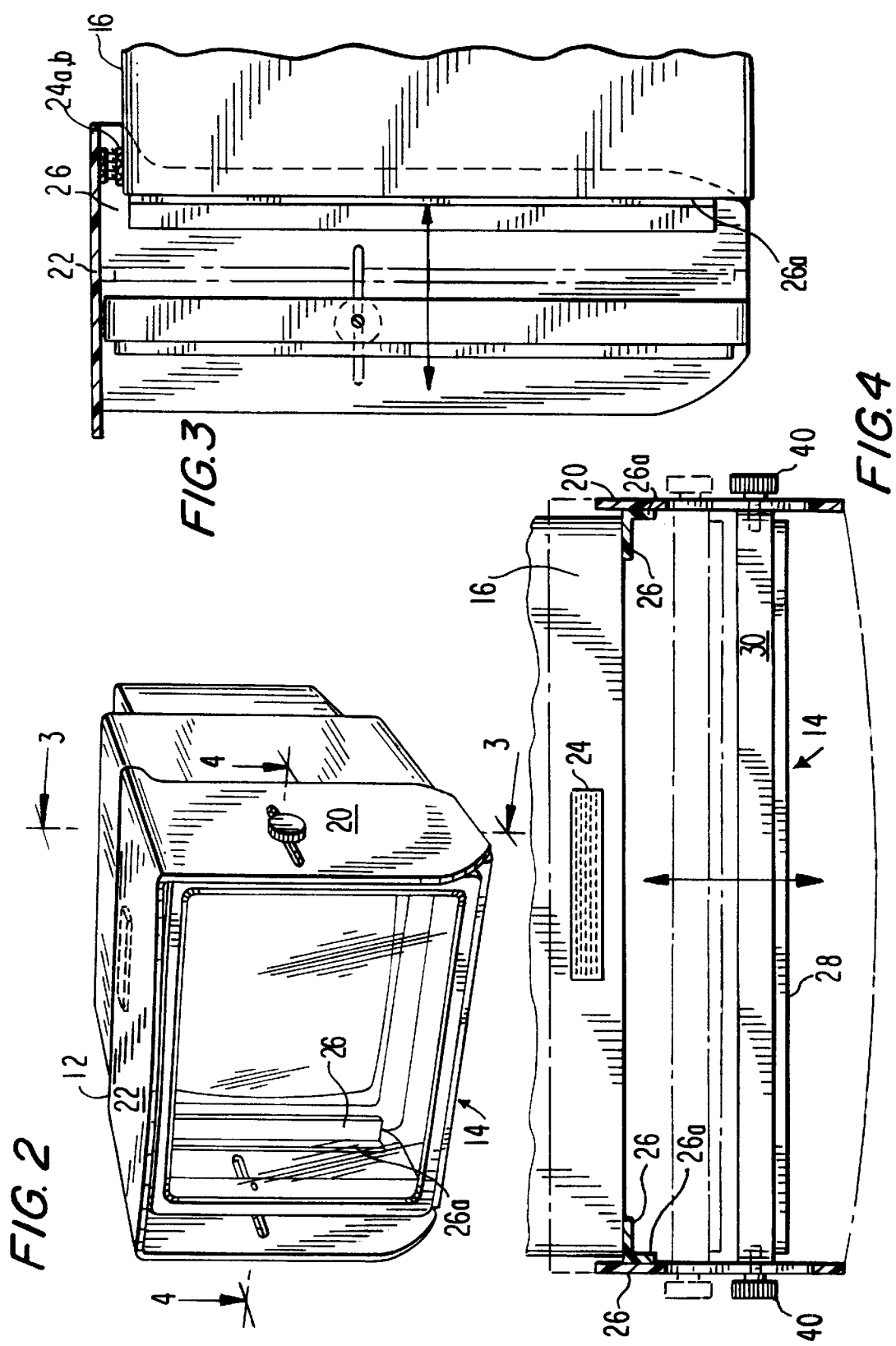

COMPUTER MONITOR SCREEN SHADE AND DYNAMICALLY ADJUSTABLE MAGNIFIER

BACKGROUND OF THE INVENTION

It is well appreciated that the continued observation of a computer monitor can cause eyestrain to the user. The limited size of the screen, coupled with the often large amount of data appearing thereon, often leads to difficulty in viewing. And because such monitors are often used in environments, such as offices, having high levels of ambient lighting, glare and reflections can further contribute to viewing difficulties.

There have been solutions to such problems. Glare shades exist which shield the screen from ambient lighting. Screen magnifiers exist which increase the apparent size, and thus the visibility of screen images. Yet there have been heretofore no devices which include a monitor screen shield which can be used with an adjustable magnifier as a complete system.

It is accordingly a purpose of the present invention to provide an improved monitor screen shade.

An additional purpose of the present invention is to provide a combined monitor screen shade and adjustable magnifier.

A further purpose of the present invention is to provide a combined monitor screen shade and adjustable magnifier which is easily installed upon a monitor, remains in place thereon, and which allows dynamic adjustment of the magnifier magnification without the necessity for removal or realignment of the screen shield.

Yet a further purpose of the present invention is to provide a combined monitor screen shade and adjustable magnifier which is convenient and efficient to manufacture, and which may be collapsed or disassembled for compact packing and storage.

BRIEF DESCRIPTION OF THE INVENTION

In accordance with the foregoing and other objects and purposes, a computer monitor screen glare shade and magnifier constructed in accordance with the present invention comprises a monitor screen glare shade having side and top shade portions which is affixed to and extends forward from the top and side edges of a computer monitor. Means are provided to fit the shade about the sides of the monitor in a light-tight manner and to simultaneously allow the screen shade to be used with monitors of differing housing sizes. A screen magnifier may be mounted to the screen shade, and is adjustably positionable at varying distances from the monitor screen, whereby the magnification provided by the magnifier may be adjusted in accordance with the user's desires. Lock means may be provided to maintain the magnifier at the desired distance from the screen. The screen glare shade may comprise two or more interfitting sections to further permit the shade to accommodate monitors of differing sizes.

BRIEF DESCRIPTION OF THE DRAWINGS

A fuller understanding of the present invention will be accomplished upon consideration of the following detailed description of a preferred, but nonetheless illustrative embodiment of the invention, when reviewed in conjunction with the annexed drawings, wherein:

FIG. 2 is a perspective view of the invention depicted in FIG. 1 installed on a monitor;

FIG. 3 is a side view in elevation taken along line 3—3 of FIG. 2;

FIG. 4 is a plan view in section taken along line 4—4 of FIG. 2; and

DETAILED DESCRIPTION OF THE INVENTION

Figure 1:
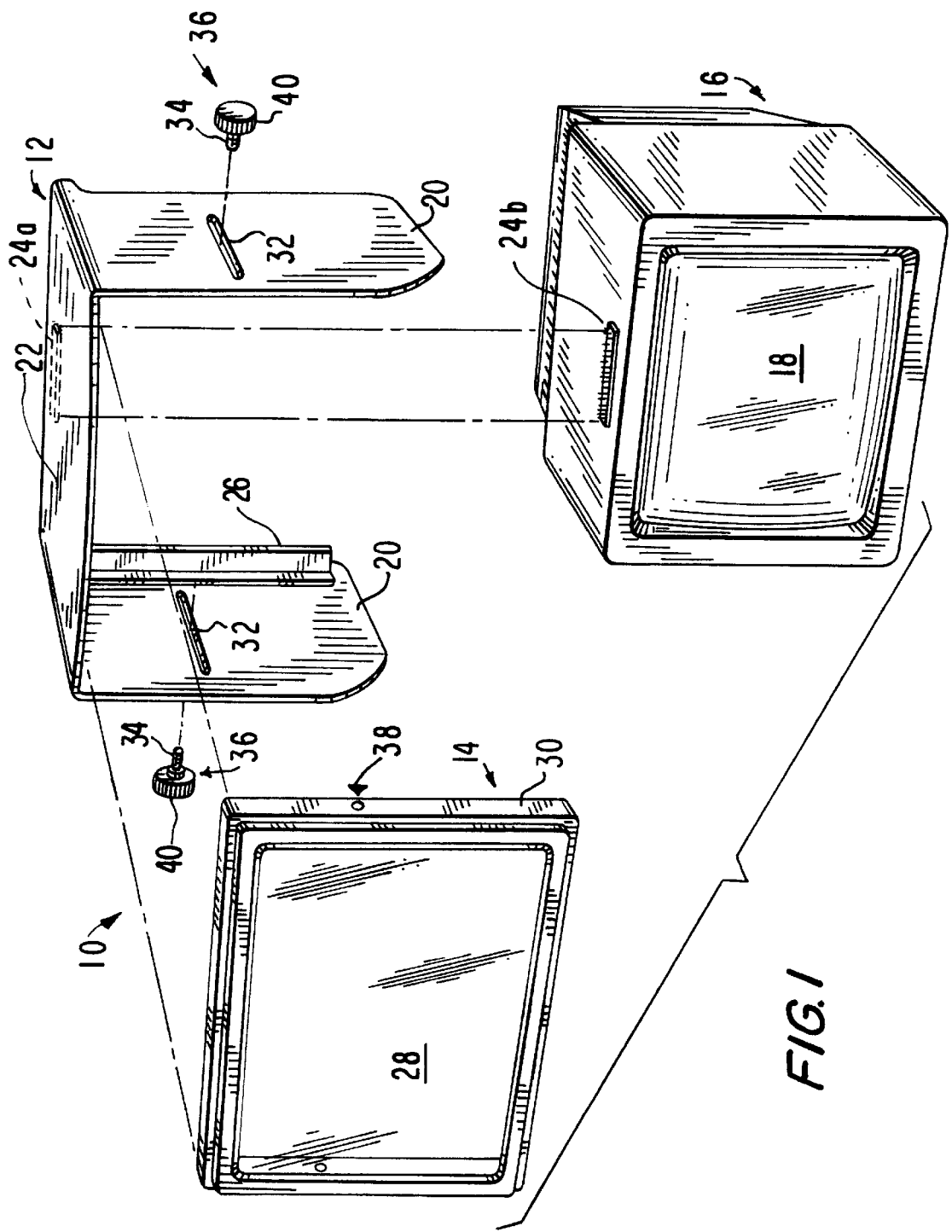
FIG. 1 is an exploded perspective view of a combined screen glare shade and magnifier of the present invention presented in associated with a computer monitor.

With reference to the Figures, a combined screen glare shade and magnifier 10 of the present invention comprises a screen glare shade 12 and a screen magnifier 14. The glare shade 12 is adapted to mount upon a computer monitor 16 and may also support the magnifier 14 in front of the monitor screen 18. The screen magnifier is adjustably positionable with respect to its distance from the monitor screen 18 to provide for dynamic variable magnification as desired by the user.

Glare shade 12 is preferably of inverted U-shaped construction, with side walls 20 and top wall 22. Both the side walls and top wall project forwardly from the monitor screen 18, as seen in FIG. 2, to shade the screen from ambient light. The width of top wall 22 between the side walls 20, as well as the length of the side walls 20, are chosen to allow the glare shade 12 to closely embrace the corresponding sides of the monitor. Alternatively, and as shall be explained infra, the shade 12 may be adjustable to allow it to conform to variously-sized monitors.

The glare shade 12 is rigidly affixed to the monitor, such as by the use of complimentary hook and loop fastener elements 24a and b mounted to the inner surface of the shade top wall 22 and a corresponding location on the monitor top. A pair of rigid strip stops 26 may be located upon the inner surface of the side walls 20 to orient the glare shade forwardly of the monitor screen. The strips 26 extend substantially the length of the side walls and may be on the order of 1.5 inches wide. The strips contact the front face of the monitor cabinet, as best seen in FIG. 4, to properly align and orient the glare shade in front of the monitor screen as well as to provide a light barrier between the glare shade and the sides of the monitor. The width of the strips accommodate monitors of differing widths, maintaining the light barrier between the monitor and glare shade sides while allowing proper positioning of the shade. As shown in the Figures, the strips may include a fastening leg 26a, which is mounted to the sidewall. Alternatively the strips may be fabricated integrally with the sidewall which may be constructed of any appropriate rigid material, such as plastic.

Screen magnifier 14 may comprise generally rectangular magnifier element 28 mounted within a frame or bezel 30. The magnifier and bezel are dimensioned to permit the magnifier to be mounted within the sides and top of the glare shade 12. The glare shade 12 is provided with positioning means, such as longitudinal slots 32 through which threaded pins 34 of adjustment means 36 project. The pins 34 mate with corresponding threaded bores 38 on the opposite sides of the bezel 30 and thus support the magnifier 14 within the glare shade 12 and permit it to be positioned at a desired distance from the monitor screen to control magnification. The adjustment means 36 include knobs 40, from which the pins project, which allow the adjustment means to be increasingly threaded into the respective bores 38, whereby the inner surface of the knobs 40 snug up against the respective side walls 20 to releasably lock the screen magnifier at the desired position. Alternative adjustment means, such as a track system, may also be employed.

Figure 5:
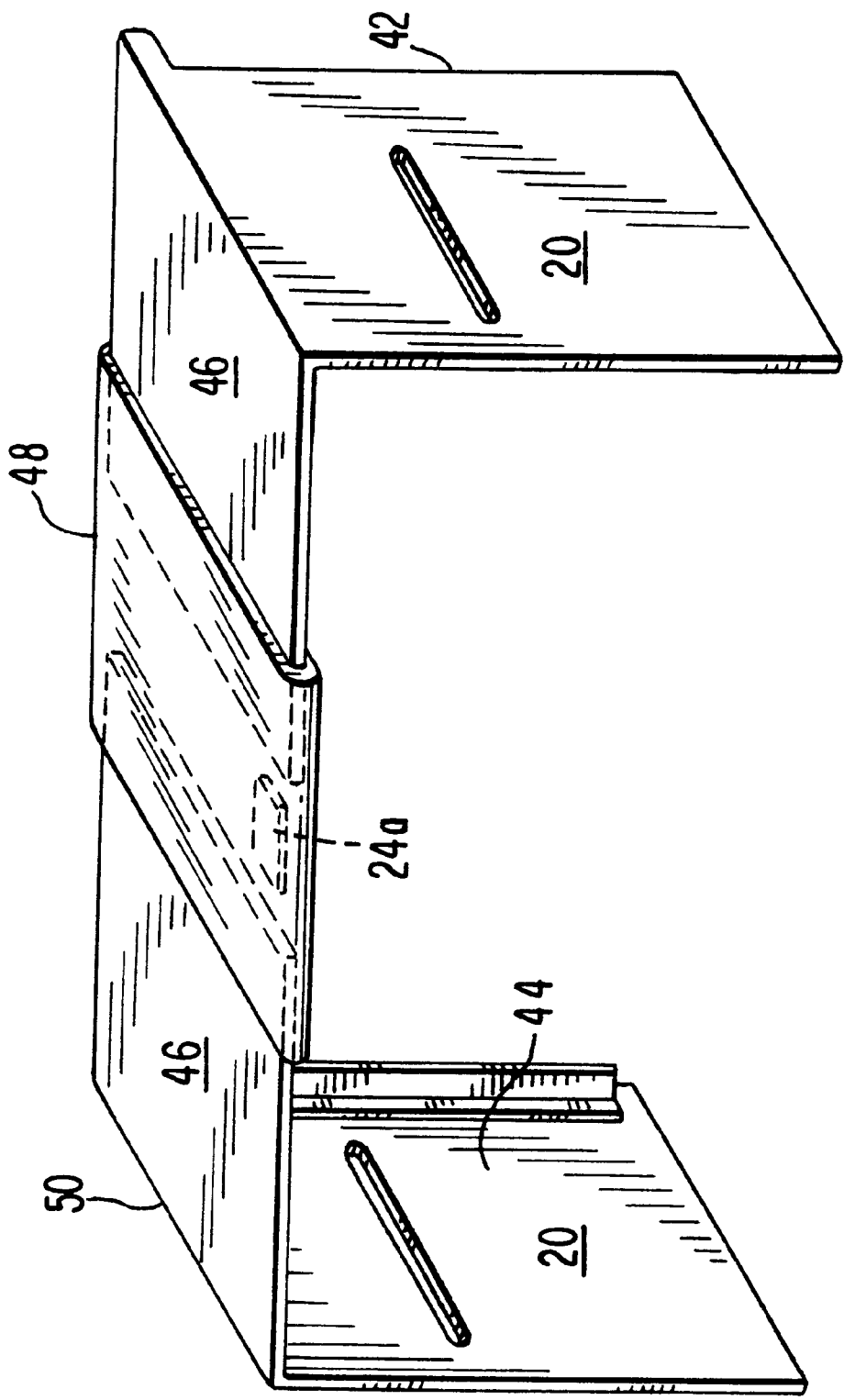
FIG. 5 is a perspective view of an alternative embodiment of the screen glare shade of the invention.

The glare shade 12 may alternatively be made adjustable to accommodate a variety of monitor sizes which extend beyond the size accommodation provided by the strip stops 26. As depicted in FIG. 5, the glare shade 12 may be constructed of two L-shaped leg portions 42, 44, each including a portion defining a side wall 20 as well as a portion 46 forming a portion of the top wall 22. The top portions 46 are joined together by intermediate sleeve portion 48. The ends of the top portions 46 are inserted into the opposed open ends of the sleeve 48, which is dimensioned to provide a snug friction fit with the portions 46. The L-shaped legs may be slid together or apart within the sleeve 48 as required to properly accommodate the width of a monitor between the side walls 20. Fastening means, such as an element of a complementary hook and loop fastener system 24, may be located on the bottom surface of the sleeve 48 to mount the shade 12 to the monitor.

The top portions 46 may be dimensioned to substantially define the width of the glare screen, as depicted, or alternatively the sleeve 48 may be of substantial length to serve as the glare screen top. In such a case the top portions 46 of the L-shaped legs may be of lesser length, sufficient merely to provide the desired range of adjustability beyond the length of the sleeve.

The magnifier 14 would typically be sized in association with the smallest width monitor with which the device is intended to be used. To accommodate wider monitors, the threaded pins 34 may be of extended length, and may be provided with a plurality of cylindrical spacers which can be used to provide contacts between the side wall 20 and the magnifier bezel 30. Alternatively, the shade structure depicted in FIG. 5 may be utilized not to provide adjustability, but to allow the device 10, and particularly the shade 12, to be disassembled and collapsed for compact storage and shipping. In such a case, it may be advisable to dimension the top portions 46 of the L-shaped legs 42, 44 such that the total length corresponds precisely to the width of the monitor with which the device is to be used. In such a case, the sleeve 48 serves substantially to connect the portions 46 together typically with their ends abutting within the sleeve. The portions 42, 46 may be further formed with an integral hinge 50 between the horizontal and vertical portions, allowing the portions to be folded flat for shipping and storage. The shade structure may further alternatively be formed in the shape of a rectangle, with both top and bottom portions to wrap fully about the monitor. In such a case both the height, as well as the width, can be made adjustable.

We claim:

1. A computer monitor screen glare shade, comprising a top and opposed sides;

means for rigidly mounting the glare shade to a monitor housing whereby a portion of the top and sides project forwardly of the monitor face;

said mounting means including rigid stop means extending substantially the length of each of said side walls and projecting inwardly from an inner surface of the side walls for contact with a front surface of said monitor housing; and a screen magnifier and complementary means located on said screen magnifier and on said sides of the glare shade for varying the magnification of the screen magnifier by positioning and maintaining the screen magnifier parallel to a display face of the monitor and at a chosen distance therefrom.

2. The apparatus of claim 1, wherein said mounting means further comprise an adhesive member on a lower surface of said top.

3. The apparatus of claim 1 or claim 2, wherein said magnification varying means comprise slot means on said hood, said screen magnifier having lock pin means to pass through said slot means.

4. The apparatus of claim 3, wherein said slot means comprise slots in said opposed sides.

5. The apparatus of claim 1, wherein said light hood top and sides are formed of a pair of mating members, each having a top forming portion and a side-forming portion and a sleeve member to join the top forming portions.

6. The apparatus of claim 5, wherein said mating members are foldable along a line between the top and side-forming portions thereof.

7. The computer monitor glare shade of claim 1, wherein said rigid stop means include means for blocking the passage of ambient light between sides of the monitor housing and the sides of the glare shade.

* * * * *